Oct. 14, 1941.  H. A. WAGNER ET AL  2,258,918
SELF-PROPELLED TILTING HOIST
Original Filed Sept. 22, 1937  4 Sheets-Sheet 1
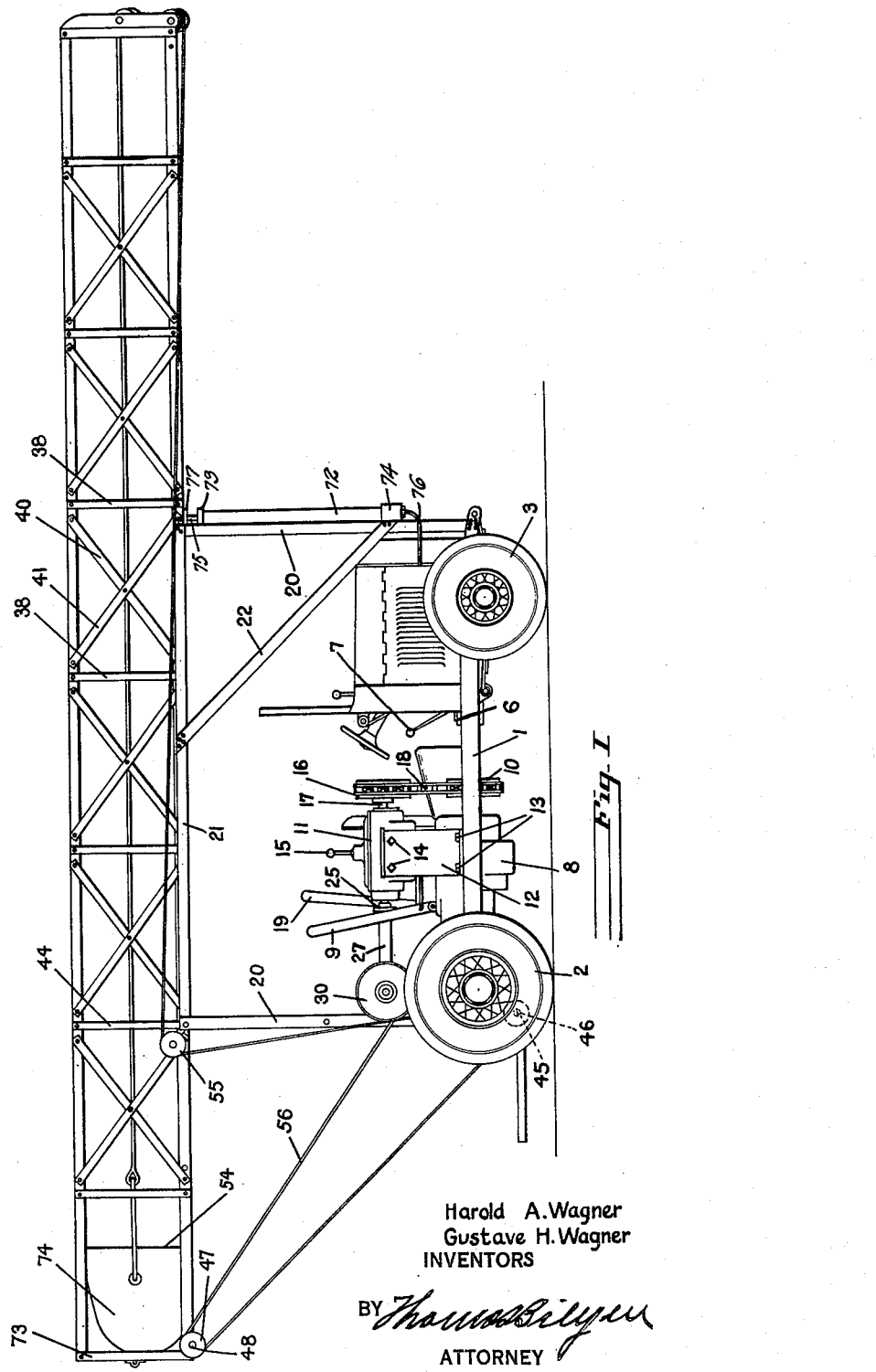
Harold A. Wagner
Gustave H. Wagner
INVENTORS
BY Thomas Bilyeu
ATTORNEY

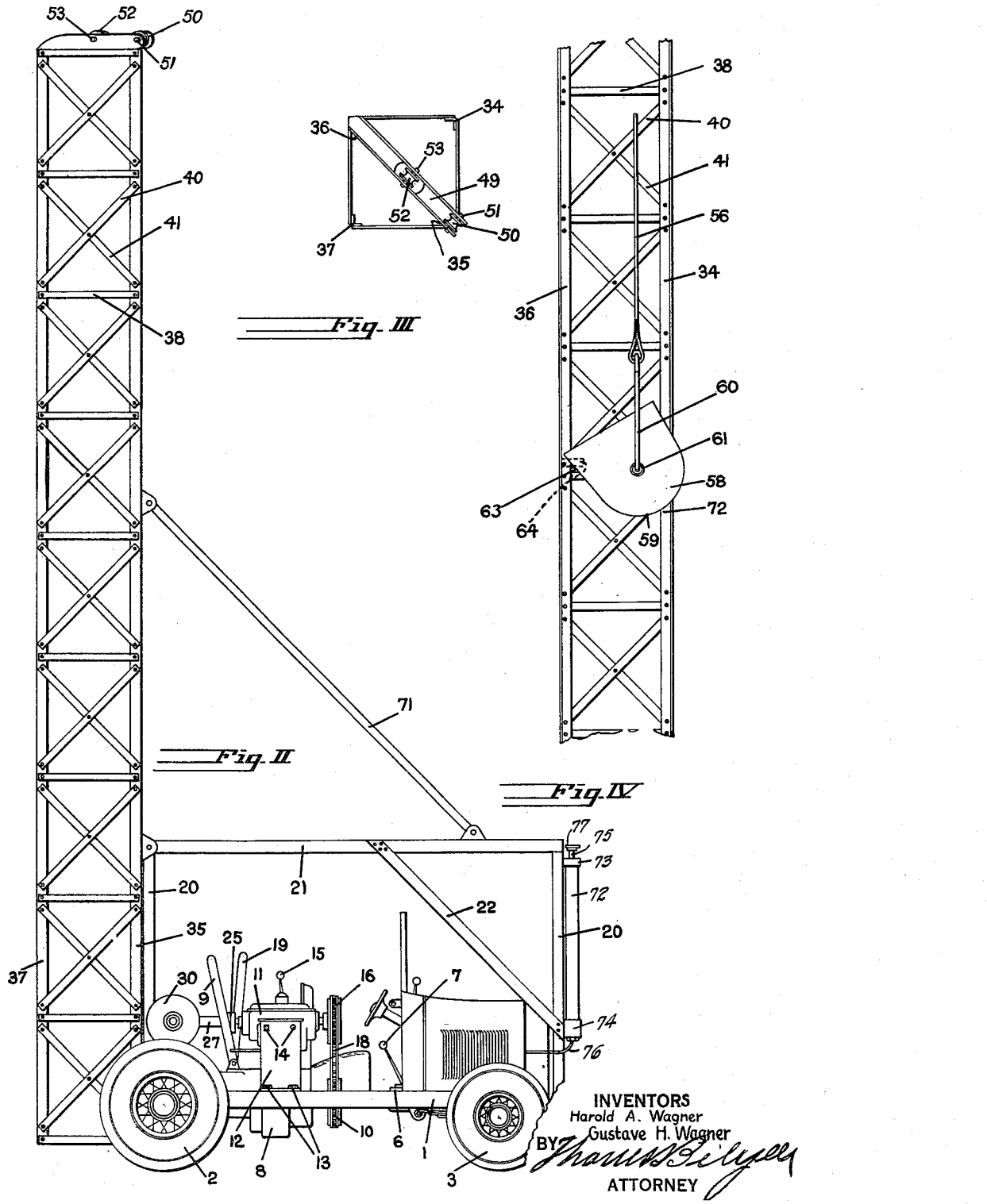

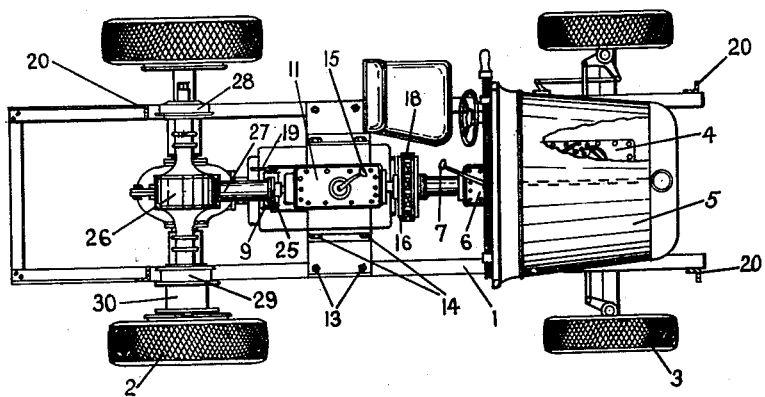
Fig. VII
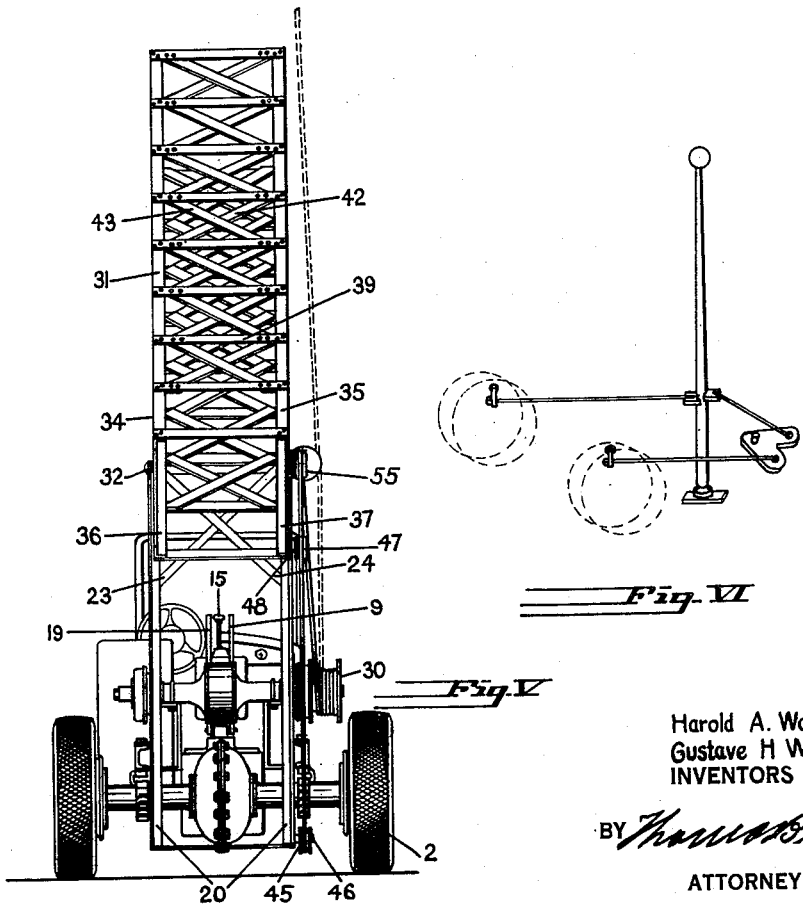
Fig. V
Fig. VI
Harold A. Wagner
Gustave H. Wagner
INVENTORS Oct. 14, 1941.   H. A. WAGNER ET AL   2,258,918
SELF-PROPELLED TILTING HOIST
Original Filed Sept. 22, 1937   4 Sheets—Sheet 4
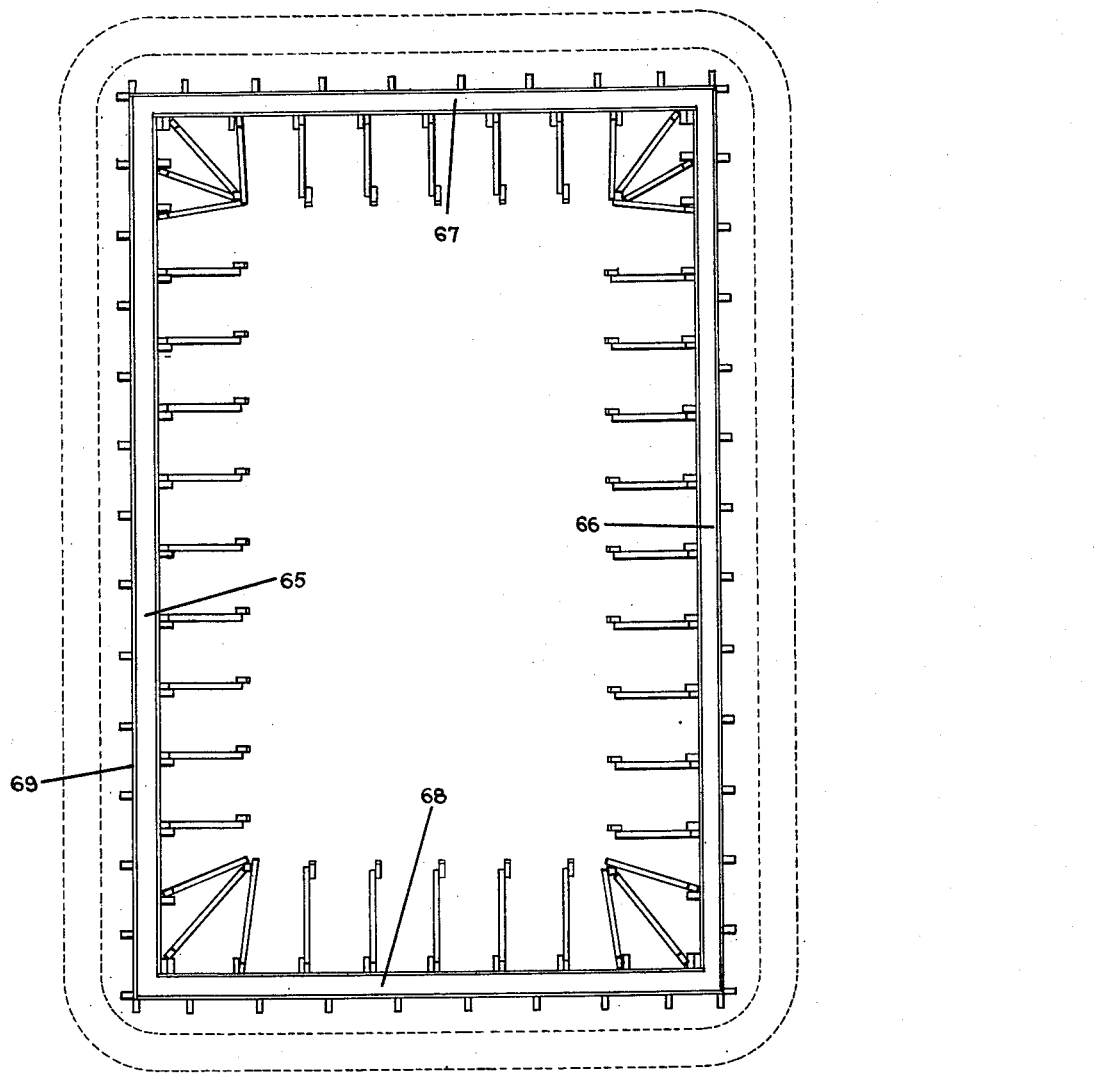
Fig. VIII
Harold A. Wagner
Gustave H. Wagner
INVENTORS
BY
ATTORNEY Patented Oct. 14, 1941

2,258,918

UNITED STATES PATENT OFFICE 2,258,918

SELF-PROPELLED TILTING HOIST

Harold A. Wagner and Gustave H. Wagner, Portland, Oreg.

Substituted for abandoned application Serial No. 164,154, September 22, 1937. This application May 21, 1940, Serial No. 336,438

7 Claims. (Cl. 214—120)

This case is a substitute for application Serial Number 164,154, filed September 22, 1937, which became abandoned September 29, 1939.

Our invention relates to self-propelled tilting hoists to be used by contractors and others and which is to be used in the hoisting of concrete aggregates, plaster, brick, and other building materials.

Heretofore it has been the general custom in the building of concrete buildings to build the forms and to fill the forms a story at a time by the building of a runway around the story to be poured and to pour the concrete aggregate within the walls and upon the floors through the use of carts and wheelbarrows.

It has also been the general custom to build a central tower in which the aggregates are hoisted and from where the same is distributed through the use of pouring chutes and the like. Both of these methods require a large amount of labor and time.

Where brick buildings have been erected it has been the general custom to raise the bricks and plaster by hod carriers.

In our new and improved device we provide a portable power hoist that carries a tiltable tower thereupon having the essential elements associated therewith for raising the tower and the building material. If the material is in a fluid condition we deliver the same into a hoisting bucket elevated within the tower and dump the material directly into the forms without the building of platforms, runways and the like. The portable self-tilting hoist is periodically moved along the wall and we pour bands of aggregate of desired height. (In concrete construction the pouring of a stage of concrete about a building or in pouring chimneys the course poured is at times called a "belt" but for the purpose of this specification we shall refer to this course as "band.")

This prevents the undue stressing of the forms into which the aggregate is to be poured. This greatly lessens the amount of preparatory labor required in the pouring of the aggregate, in the hoisting of the same and also provides a hoist that may be used on a number of jobs during the same day with a minimum of delay. It also provides facilities for using ready mixed concrete or ready prepared plaster which may be delivered from a central plant to the hoist by aggregate carriers in order that a continuous operation may be carried on to thereby perform the job in much less time than has heretofore been possible.

Our invention is comprised primarily of a self- propelled truck having a hoist associated therewith and having a tiltable tower hingedly associated with and secured to the truck with a cradle being provided on the frame of the vehicle for supporting the tower when the same is hinged downward. The hoist is used for hoisting the tower, also for raising the hoisting platform associated with the tower. The object being to provide a device that may be moved from job to job without delay and without the time usually required to make the set.

Our device may be moved around or along the wall or positioned at the point of pouring or delivery of the aggregates to thereby eliminate the necessity of advance preparation being made in the way of runways and the like for the pouring operation.

The primary purpose and object of our invention is to provide a device for the purpose intended that may be moved with dispatch and with its own power.

A further object of our invention is to provide a device of the character described and for the purpose intended, that may be erected into position of use by the hoist associated with the self-propelled truck upon which the same is mounted.

A still further object of our invention is to provide a portable truck having a tower associated therewith that may be hinged down upon the truck and moved from place to place. Through the use of the hoist mounted upon the truck the tower may be erected and the hoist may be used for hoisting and raising the lifting mechanism within the tower upon which the material is to be raised is deposited and from which the same is to be poured.

A still further object of our invention consists in so constructing the tower mechanism that it may be telescopic in its use, to thereby adapt the same for pouring low buildings or medium height buildings with the same facility.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a side view of the device, illustrating the tower folded down and being supported upon a supporting deck associated with the frame of the device.

Fig. II is a fragmentary side view of the device and a fragmentary side view of the tower erected.

Fig. III is a plan view of the head works of the tower.

Fig. IV is a fragmentary side view of the tower and a side view of the hoisting bucket. The bucket as shown in full line is in its normal position for receiving material.

Fig. V is a rear end view of the device and a rear view of the tower, with the tower being shown in partially raised position.

Fig. VI is a perspective diagrammatical layout of the brake levers used for braking the respective floating axles on the hoisting transmissions and illustrating the link and pull rod assemblies associated therewith.

Fig. VII is a plan view of the truck. This view is made to particularly illustrate the relationship of the respective transmissions associated with the prime mover of the truck.

Fig. VIII is a plan view of a concrete building to be poured, illustrating the concrete forms in place for the pouring of the walls and the floor of a building, the building is rectangular in plan view. This view illustrates the adaptation of our device in the pouring of the concrete in a building of this kind wherein the truck and tower may be moved entirely around both sides and both ends of the building.

Like reference characters refer to like parts throughout the several views.

In our device we provide an especially built truck having a heavy frame 1. Rear driving and traction wheels also are provided and front supporting and steering wheels 3 are also provided. An engine 4 of the conventional type is disposed under the hood 5. The conventional transmission gear box 6 is provided having a gear shift lever 7 associated therewith. This gear shift assembly is used for the driving of the truck at different speeds.

A compound transmission 8 is in registry with and may be operated by the transmission 6, and the gear shift lever, and the compound transmission 8 is intended only for the driving of the truck and the making of the truck mobile in extremely low gear drive ratios. A gear shift lever 9 is associated with the compound gear 8 and the transmission 8 is disposed between the normal transmission 6 of the truck and the rear axle. We also place a sprocket 10 upon that portion of the drive shaft of the truck disposed between the standard transmission 6 and the compound transmission 8 and we superpose a hoisting transmission 11 above the compound transmission 8, and the same is supported directly upon the frame 1 of the motor vehicle by supporting struts 12 that are disposed at either side of the truck. The base end of each of the struts 12 rest upon the truck frame and are secured thereto by any conventional fastening means, as through the use of bolts 13. The upper ends of the struts are secured to the case of the transmission 11 by fastenings as bolts 14.

A shift lever 15 is associated with the transmission 11, and a sprocket 16 is disposed upon the transmission shafts 17 and a chain drive 18 is trained about the respective sprockets 10 and 16 and transmits power from the drive shaft of the motor vehicle independently of the compound transmission 8. The gear shift lever 7 may transmit any desired gear ratio drive to the sprocket and by the manual manipulation of the gear shift levers 9 and 19 associated with the over-drive transmission 8. Driving force is not delivered to the steering and supporting wheels 3 of the motor vehicle. A supporting platform comprised of posts 20 that are secured to the frame 1 upon their lower ends and to horizontal beams 21 associated with the top ends of the posts 20.

Cross horizontal braces are associated with the top ends of the posts 20 to form a support for the tower that rests thereupon when the assembly is being moved from one job to another and when the tower is in lowered horizontal position and resting thereupon.

Braces 22 connect the posts with the horizontal rails 21 and tie the support for the tower together and brace the same horizontally and cross braces 23 and 24 brace the tower support transversely.

A universal joint 25 is associated with the output end of the power shaft of the transmission 11, and a housing 26 is secured to a sleeve 27 that connects the transmission 11 with the housing 26.

Brake drums 28 and 29 are associated with the respective floating axles. These brake drums are for the purpose of independently braking the respective axles to thereby control the winding drum 30 associated with one of the axles and to simultaneously permit the entire train of power assembly being continuously operated from the engine 4 to the winding drum 30.

A latticed tower 31 fabricated from structural shapes is hingedly mounted to the frame by pintle shafts 32 and 33 that are associated with the respective side columns 34 and 35 of the tower and the side frames 21 and the rear posts 20 of the tower cradle support.

The tower is comprised primarily of corner posts 34, 35, 36, and 37. and these corner posts are divided into a plurality of latticed panels that are formed by struts 38 and 39 and diagonal braces 40 and 41, 42, and 43.

Where the tower is to be used as a ladder also, one of the sides of the latticed tower may have additional struts 44 which when used in conjunction with the struts 38 may be used as rungs to form a ladder and which may be used for the inspection of the parts of the tower assembly and for climbing the tower to various levels in which concrete is being poured and other aggregates are being hoisted from floor to floor to be constructed.

A sheave block 45 is mounted upon a suitable shaft that is underslung from the frame 1 and is supported upon suitable brackets 46. The same is preferably mounted upon the lower end of the rear posts 20 that are secured to the frame 1 and downwardly extend therefrom. A sheave block 47 is mounted upon a shaft 48 disposed at the base end and the underside of the tower assembly. A beam 49 extends diagonally across the top end of the tower and the same rests directly upon corner posts 35 and 36, and a sheave block 50 is disposed at one end of the beam 49, and the sheave block is rotatably mounted relative thereto about a shaft 51. A sheave block 52 is mounted midway the ends of the beam 49, and the same is journaled relative thereto about a shaft 53.

The hoisting line 56 runs from the sheave 53 to the bucket or platform 54 that is to be hoisted, and the hoisting line is secured thereto upon one of its ends and the same is trained about sheave 53, sheave 50 and sheave 55, sheave 45, sheave 47 and directly to the winding drum 30. The bucket or platform is checked relative to the tower frame. In order to facilitate this being done, we secure an eye bolt 72 to the base end of the bucket and a holding-down cable 74 having a suitable hook secured therein is secured to the cross bar 73. When pull is applied to the cable and the bucket is choked, the base end of the tower is tilted downward by the application of pull to the cable 56.

If the tower is especially long the initial start to the tower may be aided manually by placing one or more pike poles 57 against the horizontal outer end of the tower and the men on the pike poles exert an up-push to the outer end of the tower in the initial stages of erecting the tower.

If the device is to be used for the hoisting of fluids as concrete aggregate or plaster or brick or roofing "hot-stuff," a bucket is used, as illustrated at 58, preferably having a rounded bottom 59. A bail 60 is provided that is secured upon its ends in suitable journaled relationship with bearings 61 and 62 disposed upon the opposite sides of the bucket.

A trip bar 63 is associated with one side of the bucket and the location of the trip for the bucket is predetermined by the positioning of a trip 64 that is secured to the posts 36 and 37. The same is movable and placeable along the levels to be encountered in the operation of the hoisting bucket or platform.

Our invention is particularly adaptable for the building of concrete buildings and where the building is rectangular, as illustrated in Fig. VIII, and is comprised of side walls 65 and 66 and end walls 67 and 68 it is possible, due to building location to go entirely around the building.

The aggregate may be poured in belt courses of suitable height within the forms 69 and 70 by moving the assembly entirely around the building.

In the event it is only possible to go around one or more sides of the building a hopper may be hung upon the outside of the tower and the concrete aggregates be flowed therefrom through the use of chutes of the conventional type.

After the tower has been erected the same may be braced in erected position by suitable struts 71 that are secured upon their base end to the cradle platform and upon their other end to suitable ones of the tower.

It will thus be seen that we have provided an assembly of instrumentalities for the pouring of concrete aggregates, the erecting of buildings, for the hoisting of materials that may be moved from place to place as a mobile device and be used on several jobs during the same day.

While the tower assembly herein shown can be and is being used on buildings of several stories in height, we believe the maximum height at which the same is applicable is about 80 feet. Buildings of this height are uncommon and where a building of this height is to be poured or constructed, we believe it would be advisable to provide additional panels to the tower that may be secured thereto by bolting into place and which is removed after the higher building has been completely erected.

Where the tower to be erected and lowered is relatively heavy, we may place a hydraulic jack in the form of a cylinder 72 adjacent the frame mounted upon the truck. The cylinder 72 is secured to the vertical members of the secondary frame by suitable fastenings 73 and 74. A piston rod 75 extends through the cylinder head of the hydraulic cylinder 72, and a piston not here shown is disposed within the cylinder 72. Operating fluids under pressure are supplied by a suitable pump not here shown and delivered from the pump into the base of the cylinder. The fluids are pumped into the cylinder to operate the piston. A suitable cross bar is disposed upon the outer end of the piston bar 75 and the same engages the tower and initially lifts the same in the initial start of raising the tower.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a truck, a pair of traction driven wheels and a pair of steering wheels associated with the truck, a standard transmission and a compound transmission associated with the truck and adapted to be driven by the prime mover of the truck, a third transmission superposed upon the compound transmission, driving instrumentalities for driving the third transmission, a winding drum associated with the third transmission and adapted for being driven thereby, and a tower supporting platform superposed the truck and supported by the truck, a plurality of sheave blocks associated with the truck and platform, and a hoisting line trained about the respective sheaves and about the winding drum.

2. In a device of the class described, the combination of a truck, a cradle platform secured to and upwardly extending from the frame of the truck, a tower tiltably associated with the cradle platform, said tower being comprised of corner posts and latticed panels, a bucket moveable longitudinally of and within the tower, means for chocking the bucket at the base end of the tower, a head works disposed at the top end of the tower, said head works having sheave blocks disposed therein, a cable secured upon its one end to the bucket and trained about the sheave blocks upon its opposite end leading to a winding drum that is power driven and mounted upon the truck, a compound transmission mounted upon the truck and instrumentalities for driving the individual units of the compound transmission and means for raising and lowering the tower by the use of the compound transmission.

3. In a device of the class described, the combination of a truck, a platform superposed upon the truck and resting upon the truck, a tower rockably associated with the platform and adapted for being raised and lowered by compound transmission instrumentalities associated with the truck, a bucket disposed within the tower and adapted for being raised and lowered within the tower when the tower is raised and settable means for dumping the bucket at predetermined settable positions within the tower, and a hydraulic jack secured to the truck and adapted for receiving power pumped actuating fluid and for initially raising the tower.

4. In a device of the class described, the combination of a truck having a plurality of independent transmissions associated therewith and said transmissions adapted for being driven by the prime mover of the truck, one set of transmissions having a hoisting drum associated therewith, gear shifting levers associated with each of the transmissions, a tower supporting platform secured to the truck and upwardly extending therefrom, and instrumentalities associated with one of the transmissions for manipulating a hoisting line.

5. In a device of the class described, the combination of a tower fabricated from structural members, a power driven rolling support for the tower and for supporting the same vertically and horizontally with said support being disposed upon the power driven rolling support, power means for raising and lowering the tower disposed upon the power driven rolling support and elevating and conveying means associated with the tower and means for power operating the elevating means disposed upon the power driven rolling support, and a hydraulic jack that has power pumped fluid for actuating the same, and said jack being directly mounted upon the truck and positioned to initially raise and finally lower the tower that is associated with the truck.

6. In a device of the class described, in combination, a truck, a cradle carried by the truck, a tower hingedly mounted upon the truck and adapted for being carried upon the cradle when the truck is being moved, and a power actuated hydraulic jack vertically disposed upon the truck and positioned so as to initially raise the tower and for lowering the tower in its final stages, and a compound transmission mounted upon the truck, and instrumentalities connecting the compound transmission with the tower.

7. In combination in a truck, a cradle mounted upon the truck and disposed longitudinally of the truck frame, a hoisting tower removably and hingedly secured to the truck, power means associated with the prime mover of the truck for finally raising the tower and for initially lowering the tower and a hydraulic jack mounted vertically upon the truck and positioned to initially raise the tower and for finally lowering the tower to a point of rest upon the cradle carried by the truck, a power driven winding drum mounted upon the truck and connected to the tower and used as an auxiliary for raising and lowering the tower.

HAROLD A. WAGNER.
GUSTAVE H. WAGNER.